United States Patent

[11] 3,591,008

| [72] | Inventor | Attilio Diefenbach |
| | | Via Borgazzi n 90, Monza, Milan, Italy |
| [21] | Appl. No. | 783,781 |
| [22] | Filed | Dec. 9, 1968 |
| [45] | Patented | July 6, 1971 |
| [32] | Priority | Dec. 9, 1967 |
| [33] | | Italy |
| [31] | | 23696A/67 |

[54] APPARATUS FOR FILTERING UNDER PRESSURE LIQUIDS TO BE CLARIFIED AND/OR PURIFIED, WITH AUTOMATIC DISCHARGE OF SOLID RESIDUES
18 Claims, 4 Drawing Figs.

| [52] | U.S. Cl. | 210/237, 210/359 |
| [51] | Int. Cl. | B01d 25/34 |
| [50] | Field of Search | 210/237, 356, 359 |

[56] References Cited
UNITED STATES PATENTS

| 2,414,487 | 1/1947 | Schuttler | 210/359 |
| 2,442,818 | 6/1948 | Lyman | 210/237 |
| 3,276,594 | 10/1966 | Gwilliam | 210/356 X |
| 3,334,748 | 8/1967 | Bozek | 210/356 X |

*Primary Examiner*—Reuben Friedman
*Assistant Examiner*—C. M. DiHow
*Attorney*—McGlew and Toren ABSTRACT: A press filter is formed of an outer filtering element concentrically arranged about an inner filtering element and forming an annular space therebetween. A filtering cloth is located within the annular space and is attached to each of the filtering elements. The filtering cloth forms a chamber into which a liquid containing solid particles is charged, with the cloth removing the solids and the liquid passing through the cloth removing the solids and the liquid passing through the cloth and the filtering elements. The filtering elements and the filtering cloth are axially displaceable between a filtering position and a discharge position where the solids are removed from the filtering cloth.

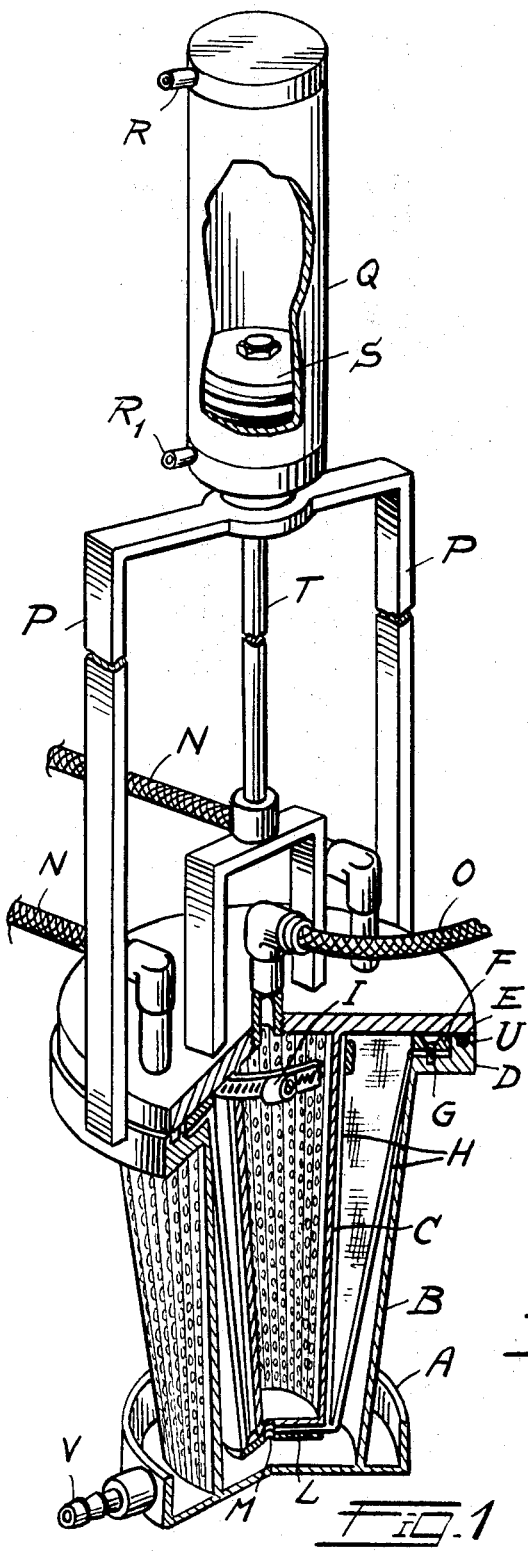
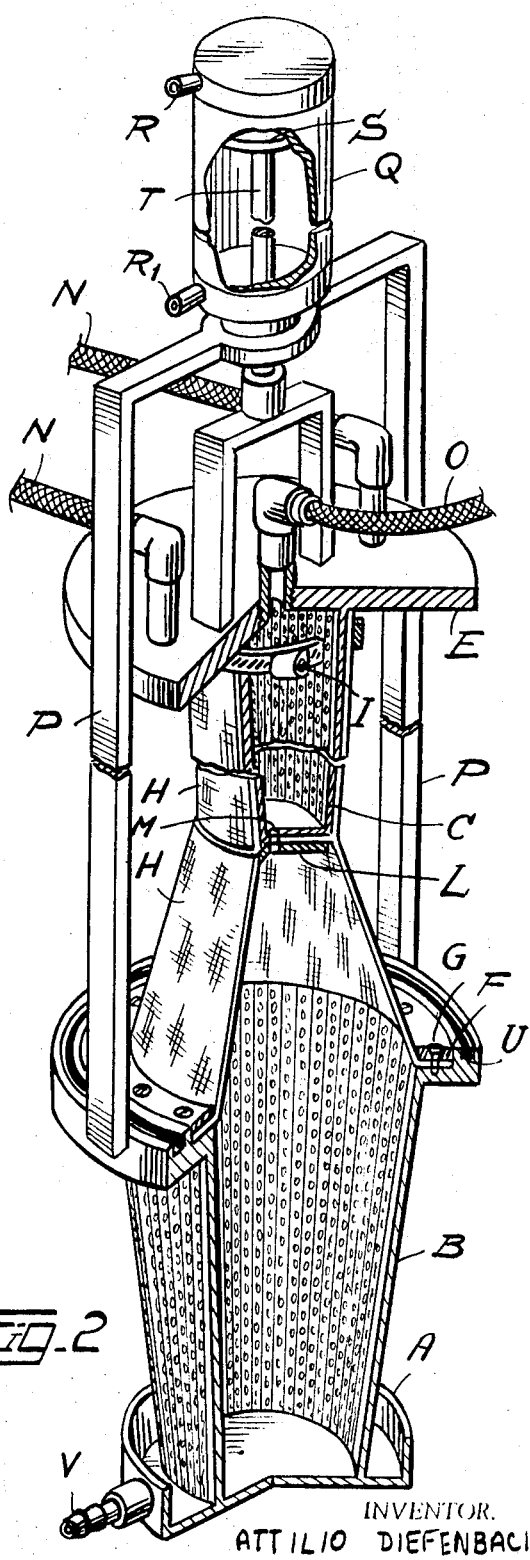

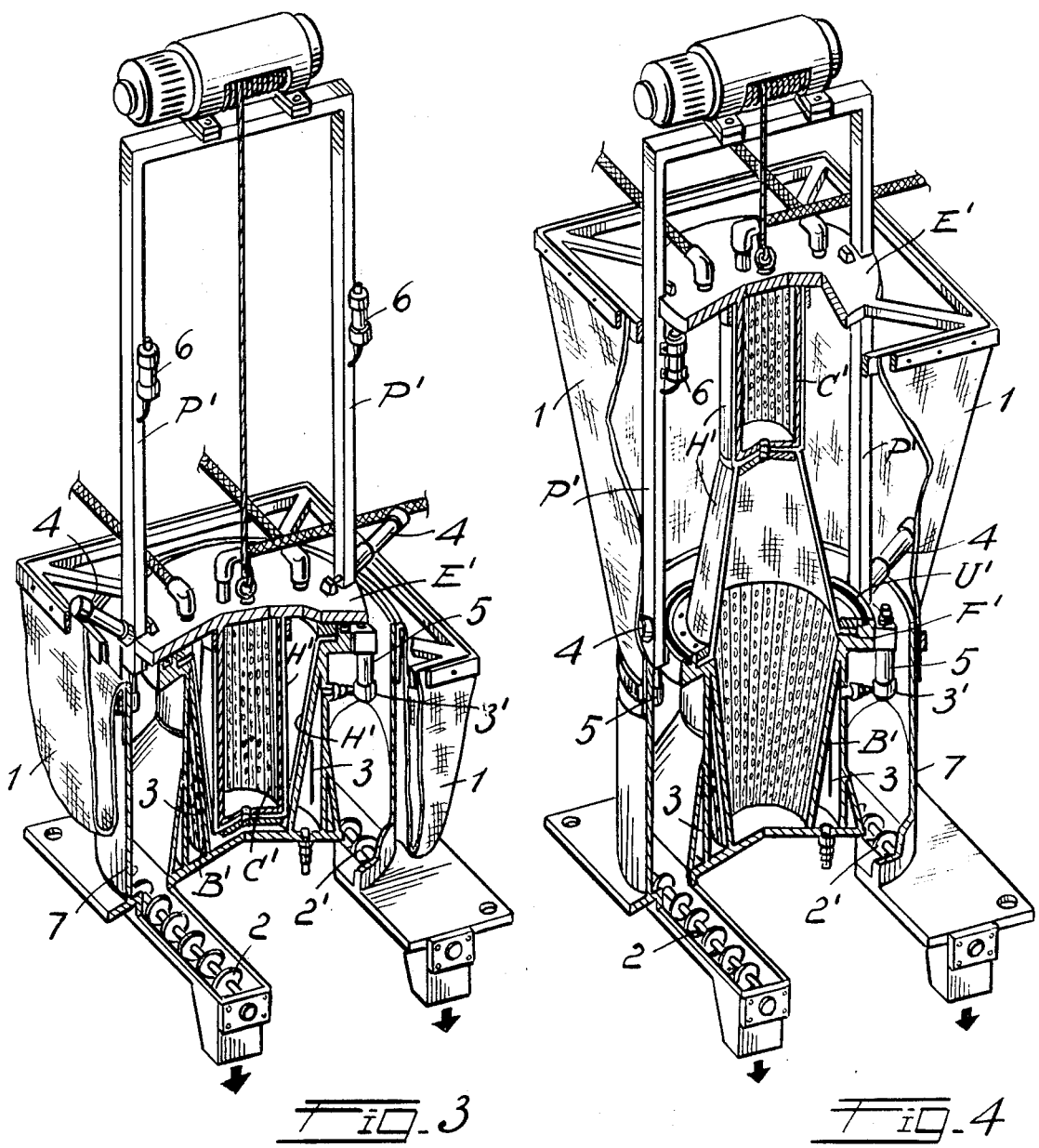

APPARATUS FOR FILTERING UNDER PRESSURE LIQUIDS TO BE CLARIFIED AND/OR PURIFIED, WITH AUTOMATIC DISCHARGE OF SOLID RESIDUES

It is known that in the chemical and food industries, in almost all the operating cycles, one of the main steps consists in filtering liquids for clarification and/or purification thereof from solids carried in suspension.

This is provided by means of press-filters or vacuum filters.

Vacuum filters have the advantage that, by being of automatic cycle, they automatically discharge the cakes left from filtration, however, the performances of such equipment are much lower than those of press-filters, so that in view of their higher and unique characteristics, it is still preferable to resort to the latter.

However, press-filters have the considerable drawback of requiring a high labour cost for the frames emptying operation when filtering has occurred.

In order to obviate to such drawback, several systems and devices have been provided but without obtaining the desired result.

With a view to provide a press-filter with all the advantages that this machine presents, and in addition with the adoption of an effective automatic discharge, an apparatus for filtering liquids under pressure liquids, according to the present invention, has been devised.

It is illustrated by way of example only and without limitation in the accompanying drawings where two preferred embodiments are shown and wherein:

FIG. 1 is an elevation, partly sectioned view of the filter ready for operation according to a first embodiment;

FIG. 2 is another elevation, partly sectioned view of said filter open, that is in the discharge position step;

FIGS. 3 and 4 are views similar to FIGS. 1 and 2 of the filter according to another improved embodiment.

As may be seen from the drawing, the apparatus according to the invention (FIGS. 1 and 2) comprises a collection base A to which are fastened a conical filtering element B, with the larger base end upwardly directed, and an inner element C.

At the upper end, the outer element B is provided with a flange D, and in turn its inner filtering element C is provided with a flange E.

In flange D in the inner upper portion, a recess is provided in which a flange F held in place by means of screws G is housed. Between the two filtering elements B and C, a filtering cloth H duly shaped like a chamber is provided, which is fixed upon the outer filtering element B by means of flange F and screws G and upon the inner element by means a steel strip I, at the top, and a ring L and a screw M at the bottom.

Flange E is joined by two feeding tubes N and a discharge tube O.

Supports P join and are fast with flange D, and carry at the upper portion the double acting pressure cylinder Q provided with feeding attachments R and $R_1$.

Cylinder Q internally houses piston S jointed to the extension shaft T.

Operation of the apparatus is as follows:
by introducing liquid under pressure by means of attachment R;
into cylinder Q, piston S is forced to be lowered and by means of shaft T to press flange E;
the latter then compresses a gasket U located between the two flanges D, E thus ensuring the necessary seal, in the filtering step.

Once closing of the filter is done, the liquid to be filtered is introduced under pressure through the two feeding tubes N, and is forced to pass through the filtering cloth H and be purified by depositing throughout the walls of the chamber formed by the same cloth, the solid suspension contained therein.

The operation is continued until the cloth chamber is full.

The liquid filtered along element B, goes down into the collecting tray A and is discharged through duct V, while the liquid filtered along element C is discharged through the upper duct O.

When filtering has taken place, if it is desired to wash the remaining cake, washing liquid will have to be introduced through duct O, which by crossing completely over cake throughout its thickness will wash it.

The washing liquid will then be discharged through element B. The same operation will be necessary if it is desired to use air or any gas, for drying the cake.

Finally, when filtering is completed, in order to discharge the cake it is enough to introduce pressure through duct $R_1$ into cylinder Q for raising piston S and with it shaft T. In fact, the filtering element C, fast with the shaft is also raised and extends and spreads the cloth H upwardly which action discharges the cake outwardly. If necessary, the cloth H may be cleaned and washed by applying brushes and spraying nozzles operating on the surface of the cloth, and this is done when opening has taken place and before the closing step.

According to another improved embodiment, the apparatus according to the invention (FIGS. 3 and 4) is provided with a conical outer filtering element B' and an inner cylindrical one C', provided with a covering flange E'.

A filtering cloth H', here preferably made in two portions, duly shaped like a chamber, is located (FIG. 4) between the two filtering elements B' and C'.

The cloth H', as viewed in FIG. 4, has its upper portion still connected to the two ends of the inner filtering element C', and the lower portion still connected with one end to the inner element C' and with the other to the outer element B' by means of flange F' and the respective setscrews.

A gasket U' ensures sealing in the filtering step, and suitable uprights P' support the lifting device.

In this original embodiment of the apparatus, the cake is retained and conveyed without coming out from the sides (see FIG. 4) from the outer flexible element 1 downwardly in the lower element 7 and then into screw feeders 2,2' which push it outwardly.

Falling down of the cake is facilitated by a suitable device 6 which is adapted to impress vibrations to the inner element C'.

It is comprised, as may be seen from the drawing, of hydraulic pistons fast with retaining springs and applied to uprights P', but it could also be mechanical or pneumatic and be applied onto flange E'.

A blind liner 3 is also provided and is located outside the filtering element B', and is adapted to internally receive by means of attachments 3', if necessary, the washing liquid for the cake or compressed air for drying of same.

The liner 3 has a characteristic function in that it allows the operations be carried out from the outside to the inside of the filtering surfaces B' and C', thus further improving operation of the apparatus.

Two pistons 4 also have to be provided for hydraulic closure of flange E' when—as shown in the drawing—lifting of said flange is effected mechanically, and another two pistons 5 to initiate lifting of said flange E' in the discharge step.

The ones described are naturally preferred embodiments of the invention as may be clearly understood by those skilled in the art, numerous variations are however possible without departing from the scope of the invention.

For example, the concentric filtering elements may be more than two in number, and fixed or movable tubes may be provided applied to the apparatus for the injection of compressed air or washing liquid for cleaning the filtering cloth H', in the discharge step, and of gasket U'.

I claim:

1. A press filter comprising an inner filtering element, an outer filtering element concentrically disposed about and spaced laterally outwardly from said inner filtering element and forming an annular space therebetween, a filtering cloth positioned within the annular space between said filtering elements, said filtering cloth comprising an inner section positioned adjacent to and extending in the general direction of said inner filtering element and an outer section positioned adjacent to and extending in the general direction of said outer filtering element, said inner section and said outer section of said filtering cloth being disposed in spaced relationship and forming a chamber therebetween, means for supplying liquid into the chamber formed by said filtering cloth, and means for displacing said inner and outer filtering elements and the inner and outer sections of said filtering cloth relative to one another between a filtering position and a discharge position so that in the discharge position said inner section and outer section are extended with one section projecting from the other whereby the chamber formed therebetween in the filtering position is opened and any solids filtered out of the liquid passing through the filtering cloth can be removed therefrom.

2. A press-filter, as set forth in claim 1, wherein said inner section of said filtering cloth being secured to said inner filtering element and said outer section of said filtering cloth being fixed to said outer filtering element.

3. A press-filter, as set forth in claim 2, wherein said inner and outer filtering elements being vertically arranged, a flange attached to the upper end of said inner filtering element, a flange attached to the upper end of said outer filtering element, whereby in the filtering position said flanges abut against one another.

4. A press-filter, as set forth in claim 3, wherein an annular gasket is fitted within a groove in one of said flanges and contacts the other said flange in the filtering position for forming a seal therebetween.

5. A press-filter, as set forth in claim 3, wherein said inner section and said outer section of said filtering cloth comprising one continuous member, said inner section being attached at its upper and lower ends to said inner filtering element and said outer section being attached at its upper end in the filtering position to the upper end of said outer filtering element.

6. A press-filter, as set forth in claim 5, wherein a steel strip encircles the upper end of said inner section of said filtering cloth for securing said filtering cloth to the upper end of said inner filtering element, a platelike member secured by a screw to the lower end of said inner filtering element for securing the lower end of said inner section of the said filtering cloth thereto, and a ring-shaped member seated in an annular groove in said flange attached to the upper end of said outer filtering element for securing the outer section of outer filtering cloth thereto.

7. A press-filter, as set forth in claim 6, wherein said means for displacing said filtering elements and said sections of said filtering cloth comprising a frame mounted on and extending upwardly from said flange on said outer filtering element, lifting means mounted on said frame and being secured to said flange on said inner filtering element for lifting said inner filter element from the filtering position into the discharge position positioned upwardly from said outer filtering element, and with said inner section of said filtering cloth projecting upwardly from said outer section of said filtering cloth which extends upwardly from the upper end of said outer filtering element and in the discharge position said cloth is opened for removing solids deposited in the chamber formed between the inner and outer sections in the filtering position.

8. A press-filter as set forth in claim 7, wherein said lifting means comprises a piston cylinder mounted on said frame, a reciprocating piston positioned in said piston cylinder and a piston rod secured at its upper end to said piston and at its lower end to said flange for moving the filtering element between the filtering position and the discharge position.

9. A press-filter, as set forth in claim 8, wherein at least one feed tube being secured to said flange mounted on said inner filtering element for supplying liquid to be filtered into the chamber formed by the inner and outer sections of said filtering cloth.

10. A press-filter, as set forth in claim 3, wherein a collecting tray being secured to and extending transversely across the lower end of said outer filtering element and projecting laterally outwardly from said outer filtering element with the portion thereof extending outwardly from the outer filtering element forming a collection space for the liquid filtered through said outer filtering element, and a lower outlet duct connected to said collecting space for discharging the filtered liquid from the collection space.

11. A press-filter, as set forth in claim 3, wherein an upper outlet duct secured to said flange on said inner filtering element and communicating therethrough with the space within said inner filtering element for discharging liquid which has passed through said inner filtering element.

12. A press-filter, as set forth in claim 3, wherein said inner filtering element being cylindrical in shape, and said outer filtering element being frustoconical in shape with the smaller diameter end thereof being located at the lower end of the filter.

13. A press-filter, as set forth in claim 3, wherein said inner section and said outer section of said filtering cloth being separate sections, said inner section being secured at its upper and lower ends to said inner element, said outer section being secured at its lower end in the filtering position to the bottom of said inner filtering element and at its upper end in the filtering position to said flange on the upper end of said outer filtering element.

14. A press-filter, as set forth in claim 13, wherein said means for displacing said filtering elements and said inner and outer sections of said filtering cloth comprising a housing element laterally enclosing and spaced outwardly from said outer filtering element, a frame mounted on and extending upwardly from the upper end of said housing element, lifting means mounted on said frame and being secured to said flange on said inner filtering element for lifting said inner filtering element upwardly from said outer filtering element from the filtering position into the discharge position and with said inner section of said filtering cloth secured to said inner filtering element extending upwardly from the end of said outer section of said filtering cloth secured to the lower end of said inner filtering element, a support frame secured to and extending laterally outwardly from said flange on said inner filtering element, and a flexible element secured at its upper end to said frame and at its lower end to said housing element, said housing element forming a space disposed about the outside of said outer filtering element, whereby when said inner element is lifted into the discharge position, said flexible element forms a lateral enclosure about said filtering cloth for directing solid material displaced from said filtering cloth downwardly into the space formed by said housing element about said outer filtering element.

15. A press-filter, as set forth in claim 14 wherein a screw feeder mounted in the bottom of the space formed between said housing element and said outer filtering element for receiving solid material displaced from said filtering cloth and for discharging the solid material from the filter.

16. A press-filter, as set forth in claim 14, wherein vibrator means being secured to said frame for imparting vibrations to said filtering cloth for displacing solids caked on said filtering cloth.

17. A press-filter, as set forth in claim 14, wherein said lifting means comprises a winch mounted on said frame, and a cable connected to said winch and secured to said flange on said inner filtering element for lifting said inner filtering element as it is guided by said frame.

18. A press-filter, as set forth in claim 14, wherein first hydraulic piston means being mounted on said frame for placing said flanges on said inner filtering element and outer filtering element into the filtering position and second hydraulic piston means being arranged for lifting said flange on said inner filtering element away from said flange on said outer filtering element when said inner filtering element is being displaced into the discharge position.